No. 780,655. PATENTED JAN. 24, 1905.
D. HEPP.
TIME RECORDER.
APPLICATION FILED SEPT. 23, 1901.

Witnesses:
Chas. O. Shurvey
S. Bliss

Inventor:
Daniel Hepp
by H Bitner
Atty.

No. 780,655. PATENTED JAN. 24, 1905.
D. HEPP.
TIME RECORDER.
APPLICATION FILED SEPT. 23, 1901.

No. 780,655. PATENTED JAN. 24, 1905.
D. HEPP.
TIME RECORDER.
APPLICATION FILED SEPT. 23, 1901.

Witnesses:
Chas. O. Shervey
S. Bliss.

Inventor:
Daniel Hepp
by H. Bitner
Atty.

No. 780,655. PATENTED JAN. 24, 1905.
D. HEPP.
TIME RECORDER.
APPLICATION FILED SEPT. 23, 1901.

Witnesses:
Chas. O. Shurvey
S. Bliss.

Inventor:
Daniel Hepp
by H. Bitner.
Atty.

No. 780,655. PATENTED JAN. 24, 1905.
D. HEPP.
TIME RECORDER.
APPLICATION FILED SEPT. 23, 1901.

Witnesses:
Chas. O. Shervey
S. Bliss

Inventor:
Daniel Hepp
by H Bitner
Atty

No. 780,655. PATENTED JAN. 24, 1905.
D. HEPP.
TIME RECORDER.
APPLICATION FILED SEPT. 23, 1901.

Witnesses:
Chas. O. Shervey
S. Bliss.

Inventor
Daniel Hepp.
by H. Bitner
Atty.

No. 780,655.

Patented January 24, 1905.

UNITED STATES PATENT OFFICE.

DANIEL HEPP, OF CHICAGO, ILLINOIS.

TIME-RECORDER.

SPECIFICATION forming part of Letters Patent No. 780,655, dated January 24, 1905.

Application filed September 23, 1901. Serial No. 76,207.

*To all whom it may concern:*

Be it known that I, DANIEL HEPP, a citizen of the United States of America, residing at Chicago, in the county of Cook and State of Illinois, have invented certain new and useful Improvements in Time-Recorders, of which the following is a specification.

My invention relates to certain improvements in time-recorders, the object of which is to record the arrival and departure of clerks and workmen and the like at the office or factory.

This invention has more particularly to do with that class of recorders in which the record is made upon a suitably-ruled sheet of paper, the record being made by the individual printing the time thereupon by means of suitable mechanism hereinafter explained.

To such end the invention relates to certain novel and characteristic improvements in the mechanism of apparatus of this class, a description whereof will be found in the following specification and the essential features more definitely pointed out in the claims.

The invention is fully described in this specification and clearly shown in the accompanying drawings, in which—

Figure 6:
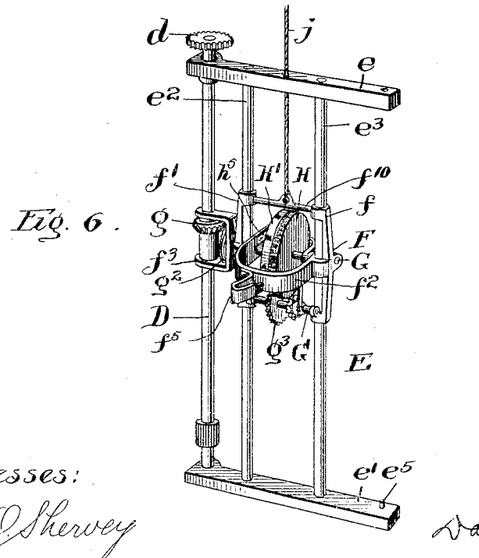
Fig. 6 is a similar view of a frame for supporting the printing-carriage.
Figure 7:
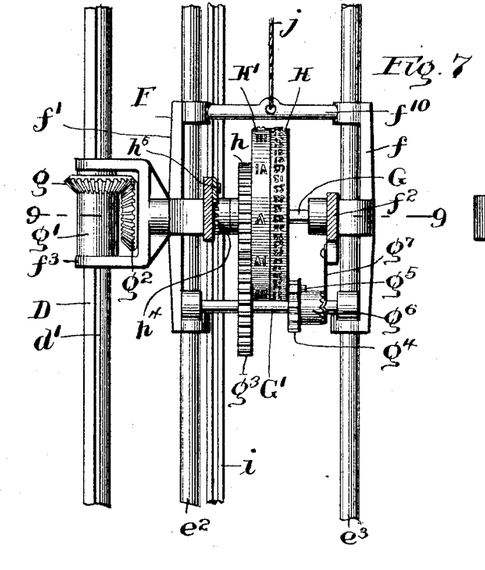
Fig. 7 is a view, partly in front elevation and partly in vertical section, of a part of the printing-frame, the line of section being indicated at 7 7 in Fig. 9.
Figure 8:
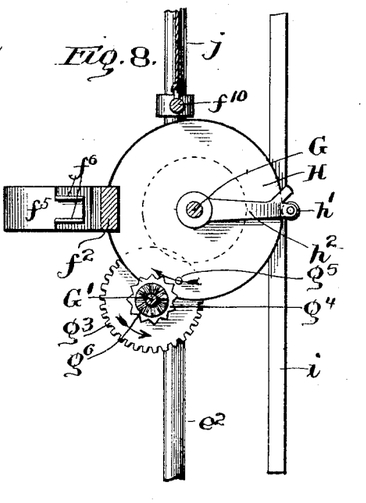
Fig. 8 is a side view of the parts seen in Fig. 7 with certain parts cut away in the line 8 8 in Fig. 9.
Figure 9:
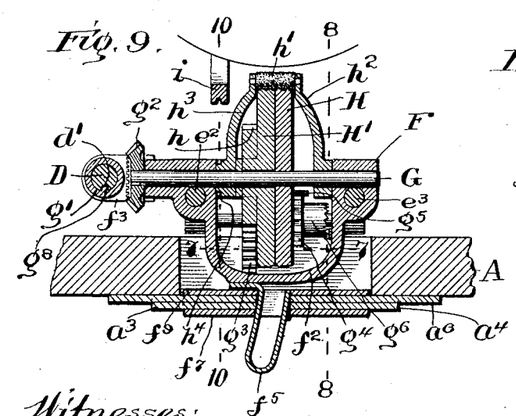
Fig. 9 is a horizontal section taken in line 9 9 in Fig. 7.
Figure 10:
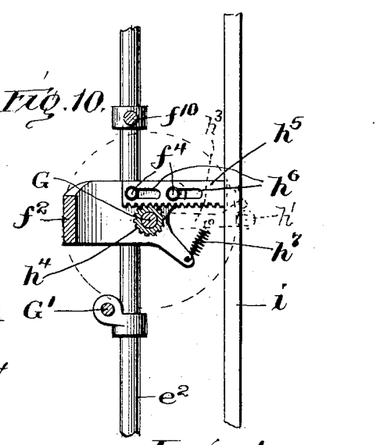
Fig. 10 is a view similar to Fig. 8 with the parts in front of line 10 10 in Fig. 9 cut away.
Figures 16, 17:
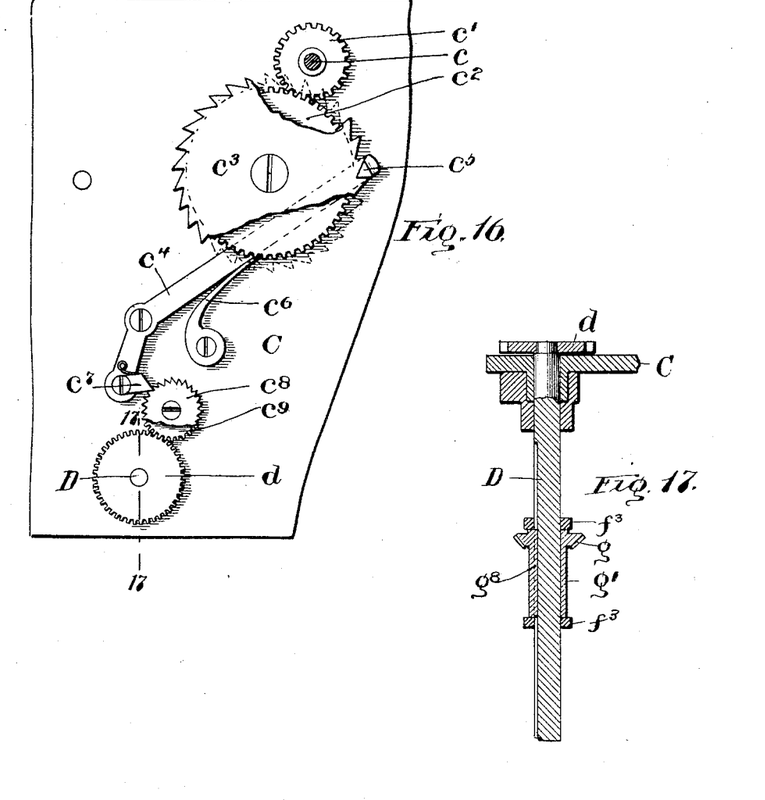
Fig. 16 is a plan view of a certain gearing between the clockwork or motor and the printing-disks.
Fig. 17 is a detail vertical section in line 17 17 of Fig. 16.

Referring first to Figs. 1 to 4, inclusive, A represents the inclosing or supporting frame or case of the apparatus, which may be of any suitable, ornamental, and substantial design, and A' the door hinged thereto at one side and adapted to close the front of the case. Upon the back of said case is secured a face-plate $a$, forming a base, upon which the operating mechanism is mounted. In the upper portion of the case is a clock B or other similar motor supported upon the face-plate $a$. The door A' may have an opening therein through which the dial of the clock may be seen. Said clock or motor operates to rotate a shaft $c$, the number of revolutions of which is four per hour in the arrangement of the various parts of the gearing between it and the printing-disks, as shown in the drawings. Looking now at Fig. 16, said shaft will be seen to have a pinion $c'$ fast upon it, which meshes with a gear $c^2$, journaled upon the top of a dust cap or plate C, secured to the face-plate $a$ and separating the clock from the lower portion of the case and acting as a dust-guard to prevent dust from getting in and clogging up the parts below. Above the gear $c^2$ and rotating therewith is a ratchet-wheel $c^3$, which engages a lever $c^4$, pivoted upon the plate C and adapted to actuate the same once per minute. The teeth of the ratchet-wheel $c^3$ engage a detent $c^5$ upon the lever $c^4$ and move the same out to the end of the tooth, when the detent drops back, advancing the printing-disks one step. A spring $c^6$ holds the lever in engagement with the ratchet-wheel, and said lever carries a pawl $c^7$, engaging a smaller ratchet-wheel $c^8$, also journaled upon the plate C, and rotating with said ratchet-wheel $c^8$ is a pinion $c^9$, meshing with a gear $d$ upon the top of a shaft D, which is driven by the action of the lever $c^4$ to rotate once per hour. The shaft D extends through the plate C and down to a bracket $a'$, in which it is journaled, said shaft forming the pivot for a swinging frame E, (see Fig. 6,) which supports the printing-carriage F. The swinging frame E is preferably made up of two horizontal bars $e\ e'$, which pivot upon the shaft D, and two vertically-extending guide-rods $e^2\ e^3$, connecting the bars $e\ e'$, to form a rigid frame, and upon these rods slides the printing-carriage F. The frame E is secured in place by a hook $e^4$, Fig. 4, upon a bracket $a^2$, engaging a pin $e^5$ upon the bar $e'$, and the upper bar $e$ may be secured in place by a pin $e^6$ or the like passing through the plate C and into a hole in said bar. By loosening the pin $e^6$ and hook $e^4$ the frame E may be swung out away from the cylinder, which is immediately back of it, to allow said cylinder to be reached. It will be perfectly clear that by constructing the frame E so as to be capable of being swung out of its normal position the printing-carriage and all parts immediately in front of the cylinder may be readily swung away therefrom to permit access to the latter without in the least disturbing the working of the clock mechanism or printing devices. The object of swinging the swinging frame away from the cylinder is for the purpose of exposing the latter in order to remove or apply the time-sheets hereinafter described.

Figure 1:
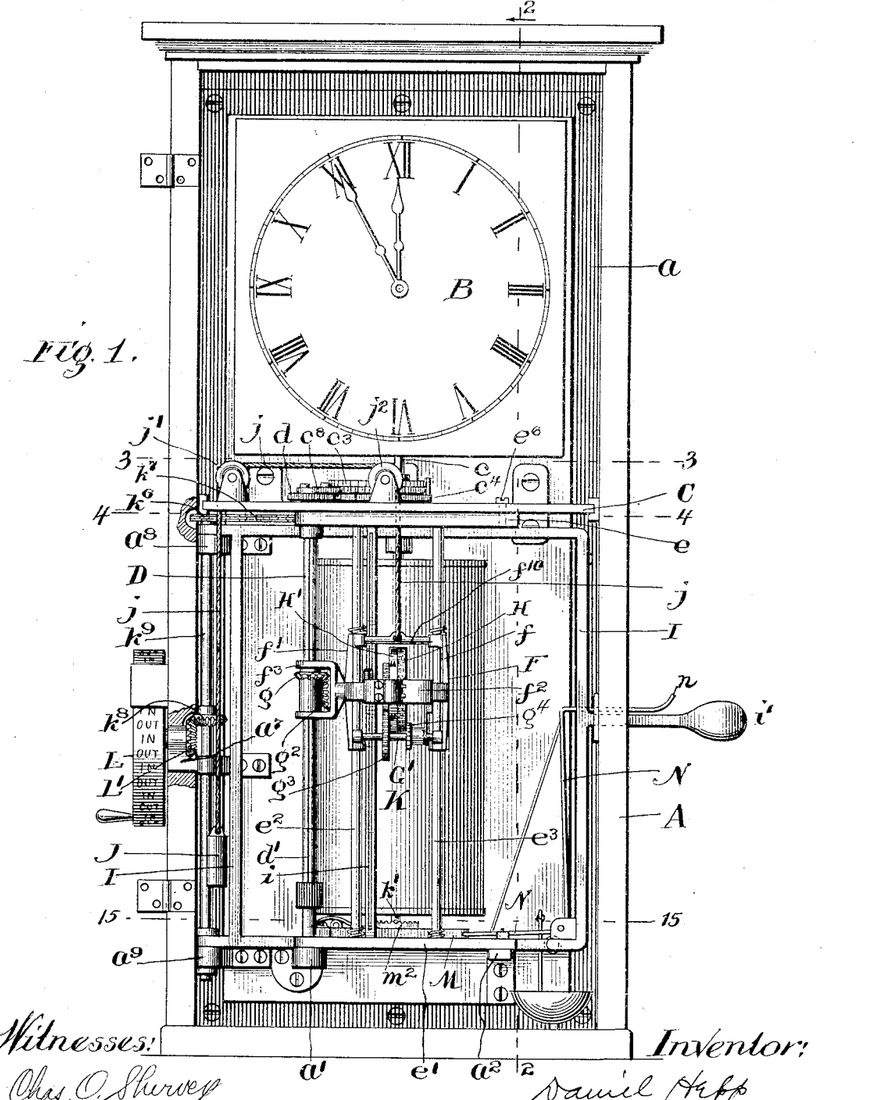
Figure 1 is a front view of the complete device with the door removed to illustrate the position and construction of the parts within the case.
Figure 2:
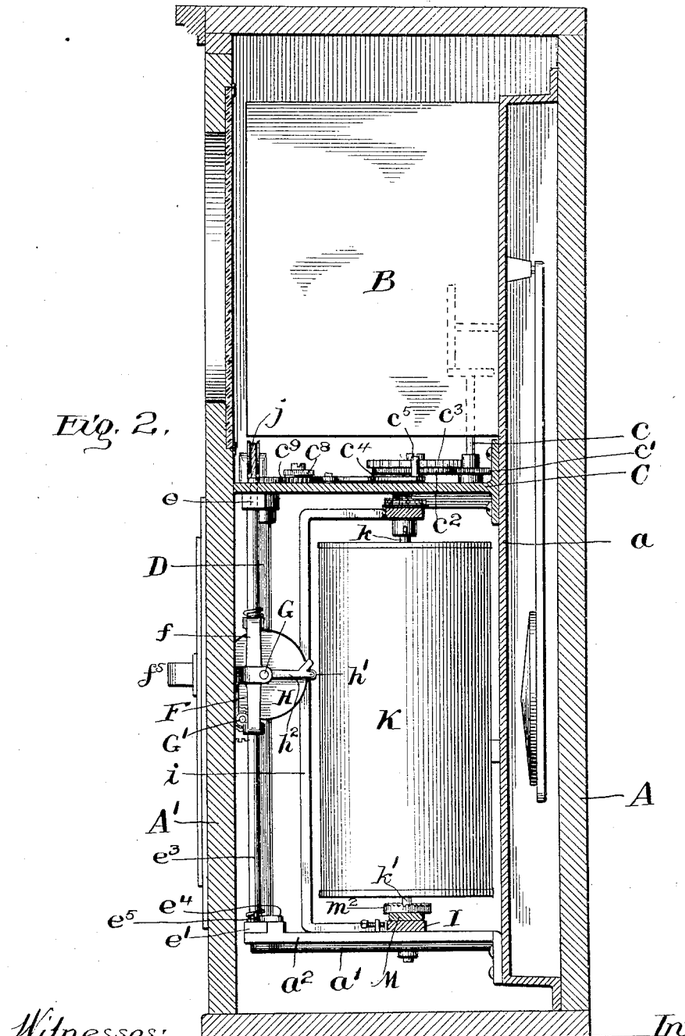
Fig. 2 is a view, partly in side elevation and partly in vertical cross-section, of the parts seen in Fig. 1 with the door added, the line of section being indicated at 2 2 in Fig. 1.
Figure 3:
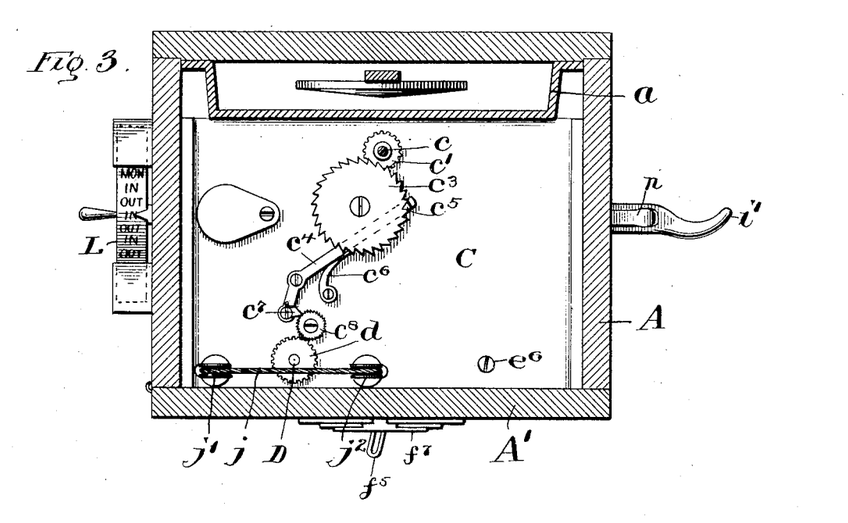
Fig. 3 is a view, partly in plan and partly in horizontal section, of said parts, the line of section being indicated at 3 3 in Fig. 1.
Figure 4:
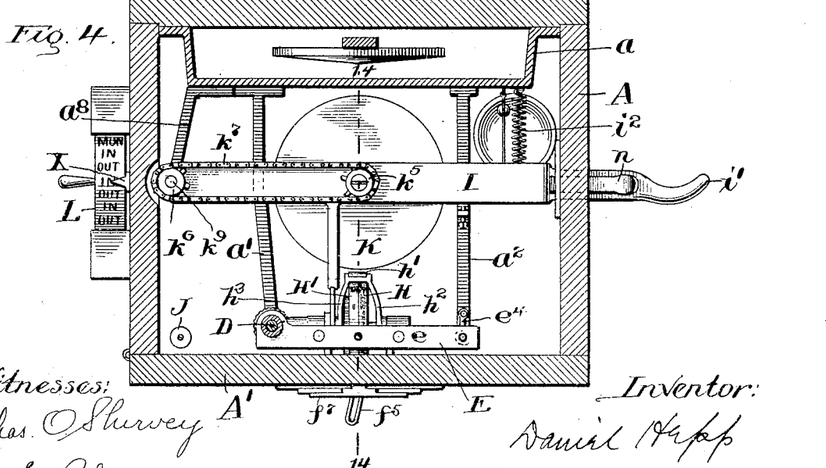
Fig. 4 is a similar view, the line of section being taken at 4 4 in Fig. 1.
Figure 5:
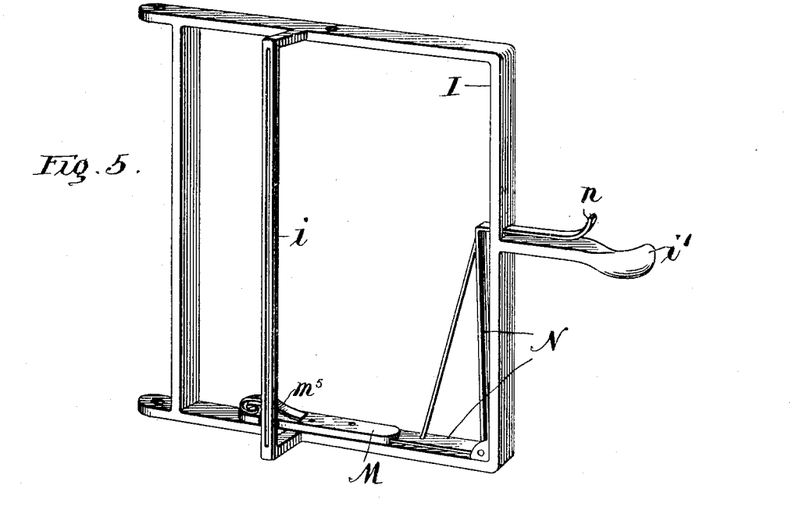
Fig. 5 is a perspective view of a swinging cylinder-frame adapted to support a rotatably-mounted cylinder upon which the ruled record-paper is supported.
Figure 14:
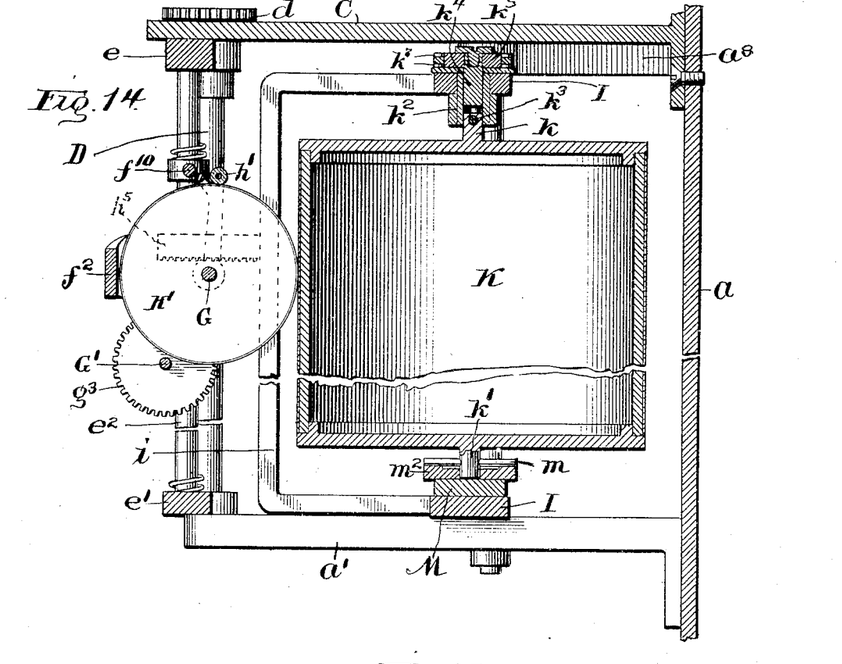
Fig. 14 is a central vertical cross-section through the cylinder and adjacent parts, the line of section being indicated at 14 14 in Fig. 4, but showing said cylinder moved into the printing position.

The printing-carriage F is preferably made up of two arms $f\ f'$, Figs. 6 to 10, inclusive, having bosses upon their ends encircling the rods $e^2\ e^3$ to slide thereon, said arms being connected by a yoked-shaped portion $f^2$. From one side of the printing-frame projects a bracket $f^3$, encircling the shaft $h^9$, and confined in it is a miter-gear $g$ and thimble $g'$. Said miter-gear and thimble are suitably connected to rotate together and are formed with a rib or spline $g^8$, running in a groove $d'$ in the shaft D, which extends longitudinally therein through its extent, thereby rotatively connecting the miter-gear with it at any point along its extent. The miter-gear $g$ meshes with a second miter $g^2$, fast upon a shaft G, journaled in the printing-carriage F, and said shaft carries two printing-disks H H' upon it, the disk H being fast thereon and the disk H' loose, so as to be free to rotate upon it. Because of the miter-gear connection between them, the shaft G is also rotated once per hour, both, however, being moved in step-by-step rotation, each step being one-sixtieth part of a circle, corresponding with the sixty minutes of the hour, and the periphery of said disk is provided with raised type characters representing the minutes of the hour. On the lower end of the printing-carriage is journaled a second shaft G', having fast upon it a gear $g^3$, meshing with a gear $h$, fast with the disk H', the shaft G' receiving also a step-by-step rotation, one step at the completion of each revolution of the minute-disk H, and thus advancing the hour-disk one step every hour. The shaft G' carries a star-wheel $g^4$, having twelve teeth, and said star-wheel lies in the path of a pin $g^5$, projecting from the side of the disk H, which engages the teeth of the star-wheel once in every revolution of the minute-disk and operates to advance the star-wheel one-twelfth of its circumference every hour, and thereby advancing the hour-disk accordingly. A toothed collar $g^6$ projects from the face of the star-wheel and engages a spring-pawl $g^7$ to retain the shaft G' in position after the pin $g^5$ has moved away from the star-wheel. In this manner the printing-disks have at all times their printing-faces in the proper position to engage the record-paper, except at the instant the changes of times take place. The type-disks H H' are inked by an ink-roller $h'$, journaled in two arms $h^2\ h^3$, which are pivoted upon the shaft G, so as to swing concentric with the type-disks. On the hub of the arm $h^3$ are formed gear-teeth $h^4$, Figs. 7 and 10, and meshing therewith is a rack-bar $h^5$, slidingly mounted upon the yoke portion $f^2$ of the printing-frame F by means of pins $f^4$ and slots $h^6$. The rack-bar is engaged by a vertically-extending bar $i$, (see Figs. 5 and 14,) which forms part of the cylinder-carrying frame I and which is moved toward the type-wheels for making a record. This rack-bar is moved toward the left in Fig. 10 by the bar $i$, and consequently turns the arms $h^2\ h^3$, carrying with them the ink-roller to the position seen in Fig. 14, bringing the same out of the way of the cylinder and inking the type over which it passes. A spring $h^7$ serves to return the ink-roller and rack-bar $h^5$ to place when the latter is released by the bar $i$.

Figure 11:
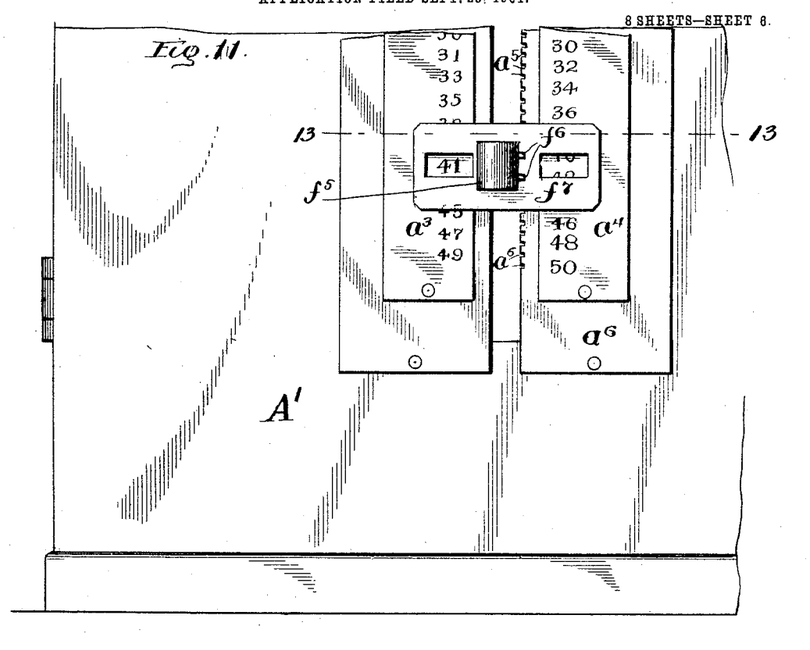
Fig. 11 is a front view of a portion of the door, showing the number-plates and a latch used to raise or lower the printing-carriage.
Figure 12:
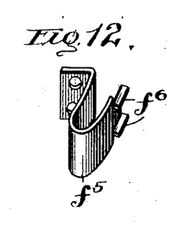
Fig. 12 is a perspective of said latch.
Figure 18:
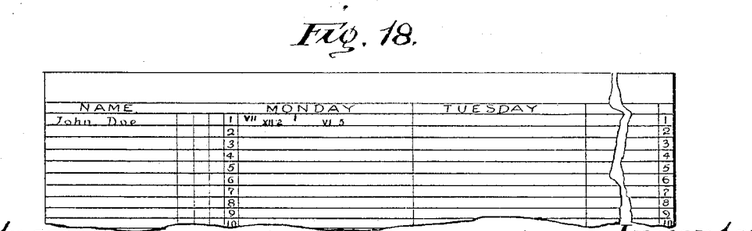
Fig. 18 is a view of a portion of a ruled time-sheet such as is preferably used in this apparatus.

It is now evident that the type-wheels H H' are in position to print the correct time of the day through the operation of the clockwork or motor B, and said type-wheels are so set that the numerals representing the correct time are in a line passing horizontally through the axis of the type-wheels and on the side adjacent the cylinder. Now, therefore, to distinguish one person's record from another the printing-carriage is moved up or down to print at different heights upon the record-sheet, and said sheet may be ruled as indicated in Fig. 18, the names of the employees being one under another and numbered as indicated. The printing frame or carriage is then moved by each person to the proper point to print upon the line upon which his name appears. To determine this exact position, the door A' is provided with a number plate or plates with the numbers of the employees indicated thereon, (see Fig. 11,) and an indicating-plate $f^7$ is carried by the carriage, having openings therein exposing one number upon the number-plate at the time, and in this manner the employee is capable of ascertaining the exact position.

Figure 13:
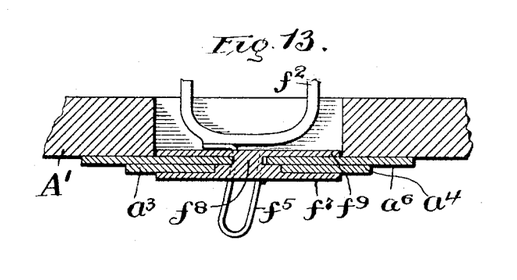
Fig. 13 is a horizontal section in line 13 13 of Fig. 11.

The carriage is raised or lowered by a thumb spring or latch $f^5$, secured to the yoke portion $f^2$ and extending out through a slot in the door sufficiently to be readily grasped between the thumb and finger, and said latch is formed with two tangs $f^6$, adapted to engage notches $a^5$ in the edge of a covering-plate $a^6$, secured to the door and closing up all of the opening in the door with the exception of a narrow slit through which the latch may project. The latch projects also through an opening in the indicating-plate $f^7$, and said plate is formed with a reduced portion $f^8$ passing through the slit between the numbering and covering plates, as shown in Fig. 13, and upon the inside said reduced portion is extended out on both sides thereof to engage the rear side of the covering-plates, as seen at $f^9$. By pinching the two arms of the latch together the tangs are drawn out of engagement with the notches, and the carriage may be moved thereby until the proper number is seen in one of the openings in the indicating-plate and the latch released, allowing the same to snap into the notches. The carriage is counterbalanced by a weight J, (see Fig. 1,) hung by a cord $j$, passing over pulleys $j'$ $j^2$, to a cross-bar $f^{10}$ upon the carriage, which makes the latter more easily handled.

Figure 15:
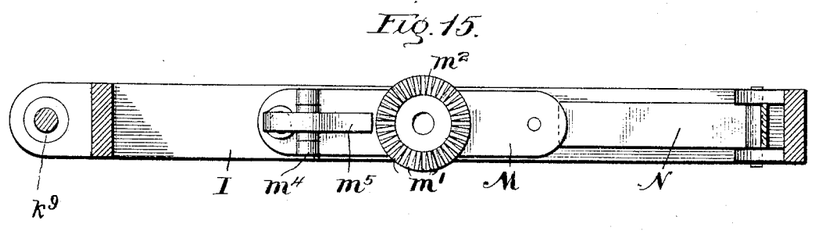
Fig. 15 is a horizontal section in line 15 15 of Fig. 1.

The cylinder K (see Figs. 1, 2, 4, and 14) is rotatably mounted in the frame I, above referred to, by means of two gudgeons $k$ $k'$, the gudgeon $k$ entering a sleeve $k^2$, journaled in the upper member of the frame I. The gudgeon $k$ has a pin $k^3$ resting in a slot in the sleeve to allow of a certain amount of limited vertical movement of the cylinder with respect to the sleeve, yet connecting them so as to rotate with each other, and in this sleeve, above the gudgeon $k$, is rigidly secured a stem $k^4$, upon which is secured a sprocket-wheel $k^5$, rotating with the cylinder. Said sprocket-wheel is geared to a second sprocket-wheel $k^6$ by a chain $k^7$, and the sprocket-wheel $k^6$ is rotated by an indicating-wheel L, journaled in a bracket $a^7$ and placed on the outside of the case, so as to be rotated when necessary to turn the cylinder K. The indicating-wheel is geared to the sprocket-wheel $k^6$ by a pair of miters L' $k^8$, the miter $k^8$ being connected to the sprocket by a shaft $k^9$. The indicator-wheel has characters upon its periphery indicating the days of the week, each day being divided into parts indicating the arrival and departure of the employees during different parts of the day, and by turning it the cylinder is correspondingly moved. The cylinder is kept from being accidentally moved out of its proper position by a pin $m$, passing through the gudgeon $k'$ and resting in radial notches $m'$, formed in a disk $m^2$. (See Fig. 15.) This disk is secured upon a lever M, pivoted upon the lower member of the cylinder-frame I, so as to swing laterally thereof, and also hinged at $m^4$, so as to be capable of swinging up and down. A spring $m^5$ tends to hold the lever M down upon the frame I at all times. The free end of the lever M engages a lifting-lever N, pivoted to the frame I and extending out through the same, where it is formed with a finger-piece $n$, by means of which it may be moved to raise the lever M. The object of this is to more clearly distinguish between the recording of the arrival and departure, one being printed slightly below the other in the raising of the cylinder.

The cylinder-frame I is pivoted upon the shaft $k^9$, and its pivot ends rest upon brackets $a^8$ $a^9$, secured to the face-plate $a$. It is provided with a handle $i'$, extending out through the case, by means of which it may be operated, a spring $i^2$ serving to draw it back away from the type-disks.

In the operation of the device the door is opened, the printing-frame E swung out of the way, and a properly-ruled record-sheet secured upon the roller. The cylinder may be of such size as to accommodate a sheet large enough to be divided into six vertical columns, representing six days of the week, and in each column may be recorded the arrival and departure at morning, noon, and night, and overtime. The sheet is thus divided into thirty-six parts in the particular arrangement shown; but the parts may be so arranged as to record each day separately or otherwise, as may be required for each particular condition. The printing-frame and door having been fastened, the apparatus is ready for use and the indicator-wheel L is set to represent the arrival of employees by moving it so that the word "In" appears at the indicator X immediately above it. The employee upon arriving grasps the latch $f^5$ and moves the indicating-plate $f^7$ to the number which represents him on the number-plate, releases the same, and draws the handle $i'$ toward him, bringing the record-sheet against the face of the type to receive the impression. At noon the indicator is moved to show "Out," and the same operation is performed by the employees. The finger-piece $n$ should then be pressed upon to raise the cylinder so as to show the difference, although it is understood that the records of the departure will be printed in a column adjacent to the column showing the arrival.

From the above it will be readily understood that the apparatus is very simple in itself and easy to operate by the workmen in making the record of the time. By the use of the counterbalanced printing-carriage the person may bring it to the proper position with reference to the ruled time-sheet without much effort, and the ease with which the printing is done upon said sheet makes the apparatus very desirable.

More or less variation of the various parts is possible, and I do not, therefore, desire to limit myself to their exact construction and arrangement.

I claim as new and desire to secure by Letters Patent—

1. A longitudinally guided and movable carriage and a clock-operated type-disk mounted therein, a number-plate, a latch secured upon the carriage and adapted to engage the number-plate to secure said carriage in proper position with reference to the number-plate, and an indicator-plate carried by the latch, to indicate such position, substantially as described.

2. A longitudinally guided and movable type-carriage, a clock-operated type-disk, a U-shaped spring-latch secured thereto and formed with tangs and a slotted covering-plate having notches in one edge of the slot, adapted to be engaged by the tangs on the spring-latch, substantially as described.

3. A cylinder adapted to carry a suitably ruled and numbered time-sheet, a longitudinally guided and movable carriage, clock-operated type-disks mounted in said carriage, a latch extending from said carriage without the casing of the device, whereby the type-disks may be brought to the proper positions in front of the ruled time-sheet, and means for swinging the cylinder upon the type-disk to impress the record upon the time-sheets, substantially as described.

4. In a time-recorder, the combination with a cylinder adapted to carry the time-sheet and means for moving it bodily in a line transverse to its axis of rotation, of a pair of guide-rods, a printing-carriage slidingly mounted upon said guide-rods, clock-operated type-disks journaled in said carriage, and a latch upon said printing-carriage, by means of which said carriage may be raised or lowered to bring the type-disks in proper relation to the ruled time-sheet, substantially as described.

5. In a time-recorder, the combination with a cylinder adapted to carry the time-sheet and means for moving it bodily in a line transverse to its axis of rotation, of a pair of guide-rods, a counterbalanced printing-carriage slidingly mounted upon said guide-rods, clock-operated type-disks journaled in said carriage, and a latch upon said printing-carriage, by means of which said carriage may be raised or lowered to bring the type-disks in proper relation to the ruled time-sheet, substantially as described.

6. In a time-recorder, the combination with a clock-rotated type-disk, a carriage supporting the same, and an impression-cylinder frame arranged for motion toward or away from the type-disk, of a suitably-supported ink-roller pivoted upon the carriage and arranged to move over that side of the disk next said frame, and means whereby the frame in moving toward the disk, forces the roller over the disk edge before the frame or cylinder reaches the roller's path, substantially as described.

7. In a time-recorder, the combination with a suitable casing and carriage arranged for moving bodily back and forth therein, of a clock-rotated type-disk mounted in the carriage, a gear carrying an arm and revoluble upon the axis of the disk, an ink-roller borne by said arm and in contact with the type-faces, a rack borne by the carriage and engaging the gear, a frame carrying an impression-cylinder, arranged for moving toward the periphery of the disk, and having a member in position to actuate the rack during such moving.

8. In a time-recorder, the combination with a carriage movable back and forth in a fixed path, of a type-disk revolubly mounted in said carriage, a gear revoluble on the axis of the disk and carrying an arm, an ink-roller mounted on said arm in contact with the periphery of the disk, a rack sliding in the carriage and engaging the gear, an impression-cylinder frame arranged to move toward the disk and thereby actuate the rack, and a spring offering yielding resistance to the consequent rotation of the gear.

9. A suitable case, a swinging printing-frame hinged therein and a disk-carriage mounted in said swinging frame and longitudinally movable therein; substantially as described.

10. A clock mechanism, a swinging printing-frame, a shaft forming the pivot of the swinging frame and synchronously rotated with the clock mechanism, a carriage longitudinally guided and movable upon the frame and type-disks geared to the said shaft; substantially as described.

11. A clock mechanism, a shaft geared to rotate synchronously therewith, a longitudinal groove in said shaft, a gear, loose upon said shaft, having a spline seated in said groove, a type-disk geared to said gear, and a carriage supporting the gear and type-disks; substantially as described.

12. In a time-recorder, the combination with a clock mechanism and a shaft rotated thereby, of a type-disk adapted to print records upon a suitable time-sheet and a device for imparting a step-by-step rotation to said type-disk, consisting substantially of a ratchet-wheel geared to rotate with said shaft, a second ratchet-wheel, a suitable spring-pressed pawl, one end of which is provided with a detent adapted to ride up the inclined faces of the ratchet-teeth, a second spring-pressed detent pivoted upon the other end of the pawl and adapted to engage the ratchet-teeth upon the second-named ratchet-wheel, a suitable gear between said second-named ratchet-wheel and the printing-disk, substantially as described.

13. In a time-recorder, the combination with a cylinder adapted to carry the time-sheet and means for moving it bodily in a line transverse to its axis of rotation, of a swinging printing-frame, a printing-carriage slidingly mounted upon said printing-frame, clock-operated type-disks journaled in said carriage, and a latch upon said printing-carriage, by means of which said carriage may be raised or lowered to bring the type-disks in proper relation to the ruled time-sheet, substantially as described.

14. A type-disk geared to move in synchronism with a suitable clock mechanism, a cylinder for carrying the time-sheet, a suitably-pivoted cylinder-frame in which the cylinder is journaled, a handle for oscillating said cylinder-frame to move the time-sheet into engagement with the type-disk to produce the record upon said time-sheet, substantially as described.

15. A type-disk geared to rotate synchronously with a suitable clock mechanism, a cylinder for carrying a time-sheet which is ruled by vertical lines to indicate arrival and departure of workmen, a suitably-pivoted cylinder-frame supporting the cylinder and adapted to be operated to throw the cylinder in one direction, to impress the record upon the time-sheet, said cylinder being rotatably mounted in the frame, and suitable means for turning said cylinder to bring the various columns upon the time-sheet before the printing mechanism, substantially as described.

16. In a type-disk geared to move synchronously with a suitable clock mechanism, a roller for carrying a time-sheet, ruled so as to present vertical columns to indicate arrival and departure of workmen, a suitably-pivoted frame supporting the cylinder and adapted to be moved in one direction, to produce the record impression upon the time-sheet, said cylinder being rotatably mounted in the cylinder-frame, an indicating-wheel adapted to indicate the position of the in and out columns with respect to the printing mechanism, suitable gearing between said indicating-wheel and the cylinder for turning the latter to present various portions of its periphery to the printing mechanism, substantially as described.

17. A type-disk geared to move synchronously with a suitable clock mechanism, a cylinder for carrying the time-sheet, a suitably-pivoted cylinder-frame supporting the cylinder and adapted to be operated to move the cylinder in one direction to produce the impressions upon the time-sheet, an indicating-wheel, a miter-gear, $L'$, fast upon a shaft, a second miter, $k^8$, to mesh therewith, a sprocket-wheel, $k^6$, a shaft, $k^9$, upon which the miter, $k^8$, and sprocket-wheel, $k^6$, are mounted, a sprocket-wheel, $k^5$, upon the cylinder, and a chain, $k^7$, connecting said sprockets, substantially as described.

18. A type-disk geared to move synchronously with a suitable clock mechanism, a cylinder for carrying the time-sheet, a cylinder-frame supporting the cylinder and adapted to be operated to move the cylinder to produce the impression upon the time-sheet, said cylinder being rotatively mounted in the frame, means for intermittently moving said cylinder to bring various portions of its periphery before the printing mechanism, a notched plate upon the cylinder-frame and a pin connected to the cylinder adapted to rest in said notches to hold the cylinder in the various positions, substantially as described.

19. The combination with a substantially rectangular cylinder-carrying frame hinged upon one end to a suitable support and provided at the other end with a handle for its oscillation, of a lever, M, pivoted upon said frame to move both vertically and horizontally, a bell-crank lever pivoted to the frame and engaging the lever, M, and provided with a finger-piece, $n$, by means of which said lever, M, may be raised or lowered and a cylinder mounted in said frame and resting upon the lever, M, and adapted to be raised or lowered by the operation of the finger-piece, $n$, substantially as described.

20. The combination with an indicator-wheel, a gear connected therewith, a shaft, a gear upon the shaft meshing with the first-named gear, a cylinder-frame hinged upon said shaft, a cylinder rotatably mounted in said frame and gearing between the shaft and cylinder for imparting rotation thereto relative to the rotation of the indicator-wheel; substantially as described.

21. The combination with a pivoted cylinder-frame, a cylinder rotatably mounted therein, an indicator-wheel, means for rotating said cylinder relative to the rotation of the indicator-wheel, a suitably-guided carriage, longitudinally movable of the cylinder, a clock mechanism, and type-disks in said carriage moving in synchronism with the clockworks; substantially as described.

22. In a time-recorder, the combination with a casing, of a rotatably-mounted cylinder, a suitably-pivoted cylinder-frame in which the cylinder is mounted and by means of which it may be moved transverse to its axis of rotation to produce the impression, a carriage longitudinally movable with respect to the cylinder, suitable clock-operated type-disks mounted therein, a latch secured to the carriage and extending without the casing by means of which said carriage may be moved longitudinally with respect to the cylinder, and suitable means for holding said latch at various points in its path, substantially as described.

23. In a time-recorder, a cylinder-carrying frame adapted to carry a time-sheet cylinder, comprising substantially a rectangular portion, I, pivoted at one end to a suitable support and provided at the other with a handle, $i''$, and formed with a bar, $i$, adapted to move certain inking mechanism away from the face of the cylinder, substantially as described.

24. In a time-recorder, the combination with a suitably-pivoted frame, a time-sheet supported therein, a type-disk, a lever for swinging said frame toward the type-disk to produce the impression upon the time-sheet and a spring for returning said frame, substantially as described.

25. In a time-recorder, the combination with a suitably-pivoted frame, a time-sheet supported therein, a clock-operated type-disk, a handle for moving said frame toward the type-disk to produce the impression on the time-sheet and a spring for returning it, substantially as described.

26. In a time-recorder, the combination with a suitably-pivoted frame, a time-sheet supported therein, a longitudinally guided and movable printing-carriage, a clock-operated type-disk journaled therein, means for swinging the frame toward the type-disk to produce the impression upon the time-sheet and a spring for returning it, substantially as described.

27. In a time-recorder, the combination with a shaft, a suitable clock mechanism adapted to impart a step-by-step rotation to said shaft, a gear mounted upon said shaft so as to be longitudinally movable thereon, but non-rotatable with respect thereto, a printing-carriage guided to move parallel with the shaft, a type-disk mounted in said carriage and gearing between said type-disk and the gear upon the shaft, substantially as described.

28. In a time-recorder, the combination with a grooved shaft and a suitable clock mechanism adapted to impart a step-by-step rotation to said shaft, of a miter-gear slidingly mounted upon said shaft and having a feather seated in the groove in the shaft, a printing-carriage guided to move parallel with the shaft, and a type-disk journaled in said printing-carriage, and geared to said miter-gear, substantially as described.

29. In a time-recorder, the combination with a shaft having a time-operated step-by-step rotation, of a printing-frame pivoted upon said shaft and having guide-rods extending parallel therewith, a printing-carriage slidingly mounted upon said guide-rods, a type-disk journaled therein, and a pinion mounted upon said shaft and geared to the type-disk and carried by said printing-frame to be bodily moved therewith, substantially as described.

30. In a time-recorder, the combination with a time-operated shaft, a groove therein, a printing-frame comprising substantially suitable bars hinged upon said shaft and other bars parallel with the shaft, a printing-carriage slidingly mounted upon said shaft, type-disks therein, a miter-gear, $g^2$, geared to the type-disks and a miter-gear, $g$, non-rotatable with respect to the shaft but longitudinally movable thereon, both of said miter-gears being mounted in the printing-frame so as to be bodily movable therewith, substantially as described.

31. In a time-recorder, the combination with a cylinder adapted to carry the time-sheet and means for moving it bodily in a line transverse to its axis of rotation, of a printing-frame, a printing-carriage slidingly mounted upon said printing-frame, clock-operated type-disks journaled in said carriage, and a latch upon said printing-carriage, by means of which said carriage may be raised or lowered to bring the type-disks in proper relation to the ruled time-sheet, substantially as described.

In witness whereof I have hereunto set my hand, at Chicago, in the county of Cook and State of Illinois, this 5th day of September, A. D. 1901.

DANIEL HEPP.

Witnesses:
BERNARD RAHN,
R. W. BARTELMANN.